US012036616B2

(12) United States Patent
Muranishi et al.

(10) Patent No.: US 12,036,616 B2
(45) Date of Patent: Jul. 16, 2024

(54) CLAMPING MEMBER, MACHINE TOOL, AND METHOD FOR MANUFACTURING MACHINED PRODUCT (71) Applicant: KYOCERA Corporation, Kyoto (JP)

(72) Inventors: Toru Muranishi, Moriyama (JP); Yoshihiro Inoue, Omihachiman (JP)

(73) Assignee: KYOCERA Corporation, Kyoto (JP)

( * ) Notice: Subject to any disclaimer, the term of this patent is extended or adjusted under 35 U.S.C. 154(b) by 122 days.

(21) Appl. No.: 17/610,601

(22) PCT Filed: May 11, 2020

(86) PCT No.: PCT/JP2020/018817
§ 371 (c)(1),
(2) Date: Nov. 11, 2021

(87) PCT Pub. No.: WO2020/230754
PCT Pub. Date: Nov. 19, 2020

(65) Prior Publication Data
US 2022/0203457 A1 Jun. 30, 2022

(30) Foreign Application Priority Data
May 13, 2019 (JP) ................. 2019-090729

(51) Int. Cl.
B23B 29/06 (2006.01)
B23B 27/04 (2006.01)
(Continued)

(52) U.S. Cl.
CPC .............. *B23B 29/06* (2013.01); *B23B 27/04* (2013.01); *B23B 29/14* (2013.01); *B23B 2210/08* (2013.01)

(58) Field of Classification Search
CPC ... B23B 29/043; B23B 29/125; B23B 29/046; B23B 27/086; B23B 27/002;
(Continued)

(56) References Cited

U.S. PATENT DOCUMENTS 3,497,935 A * 3/1970 Bowling ................. B23B 27/04
407/108
3,688,366 A * 9/1972 Jones .................... B23B 29/043
407/101
(Continued)

FOREIGN PATENT DOCUMENTS

JP 48-091579 U 11/1973
JP 49-016994 A 2/1974
(Continued)

OTHER PUBLICATIONS

JP-2008238350-A Machine Translation (Year: 2023).*
JP-2009107053-A Machine Translation (Year: 2023).*

*Primary Examiner* — Nicole N Ramos
(74) *Attorney, Agent, or Firm* — Volpe Koenig (57) ABSTRACT A clamping member in a non-limiting aspect of the present disclosure may have a columnar shape extended from a first end to a second end. The clamping member may include an upper jaw, a lower jaw and a pocket. The upper jaw and the lower jaw may be located away from each other. The pocket may be located between the upper jaw and the lower jaw. The upper jaw may include a first member and a second member. The second member may be located closer to the first end than the first member. Hardness of the first member may be first hardness, and hardness of the second member may be second hardness. The first hardness may be different from the second hardness.

17 Claims, 8 Drawing Sheets (51) Int. Cl.
*B23B 29/12* (2006.01)
*B23B 29/14* (2006.01)

(58) Field of Classification Search
CPC ............ B23B 2210/12; B23B 2250/00; B23B 2250/16; B23B 2226/33
See application file for complete search history.

(56) References Cited

U.S. PATENT DOCUMENTS

| | | | | |
|---|---|---|---|---|
| 4,530,263 | A * | 7/1985 | Muntel | B23B 29/04 407/85 |
| 5,516,241 | A * | 5/1996 | Plutschuck | B23B 27/04 407/110 |
| 5,934,843 | A * | 8/1999 | Brask | B23B 27/04 407/108 |
| 6,139,227 | A * | 10/2000 | Schafer | B23B 27/04 407/111 |
| 7,331,736 | B2 * | 2/2008 | Nicholas | B23B 29/043 407/91 |
| 9,457,410 | B2 * | 10/2016 | Törnström | B23B 29/248 |
| 9,993,877 | B2 * | 6/2018 | Malka | B23B 27/10 |
| 10,029,312 | B2 * | 7/2018 | Thelin | B23B 27/10 |
| 2008/0131215 | A1 * | 6/2008 | Sjoo | B23B 27/10 407/117 |
| 2010/0135736 | A1 * | 6/2010 | Hecht | B23B 27/04 407/101 |
| 2011/0293382 | A1 | 12/2011 | Chistyakov | |
| 2013/0129428 | A1 * | 5/2013 | Henry | B23B 27/04 407/11 |
| 2014/0133924 | A1 * | 5/2014 | Oren | B23B 27/10 407/11 |
| 2016/0193661 | A1 | 7/2016 | Kurokawa | |
| 2020/0254629 | A1 | 8/2020 | Matsuzaki et al. | |

FOREIGN PATENT DOCUMENTS

| | | |
|---|---|---|
| JP | 58-027005 U | 2/1983 |
| JP | 59-191291 U | 12/1984 |
| JP | 61-042722 Y2 | 12/1986 |
| JP | 2008238350 A * | 10/2008 |
| JP | 2009-028857 A | 2/2009 |
| JP | 2009107053 A * | 5/2009 |
| JP | 2013-527039 A | 6/2013 |
| JP | 2016-182671 A | 10/2016 |
| JP | 6011747 B1 | 10/2016 |
| JP | 2018-075676 A | 5/2018 |
| WO | 2019/049639 A1 | 3/2019 |

* cited by examiner

CLAMPING MEMBER, MACHINE TOOL, AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2020/018817, filed on May 11, 2020, which claims priority to Japanese Application No. 2019-090729, filed May 13, 2019, which are entirely incorporated herein by reference.

TECHNICAL FIELD

The present disclosure may relate to a clamping member that holds a cutting tool used in a cutting process. Specifically, the present disclosure may relate a clamping member that holds a cutting tool used in a turning process, such as a grooving process.

BACKGROUND

A clamping member to hold a cutting tool used in the turning process may conventionally be known, and a machine tool including the clamping member may also be known. For example, Japanese Unexamined Patent Application Publication No. 2016-182671 (Patent Document 1) may discuss a cutting tool (machine tool) for the grooving process which includes a tool block for holding a plate-shaped member (cutting tool), and a clamping member (upper jaw) for fixing the plate-shaped member to the tool block.

SUMMARY

A clamping member in a non-limiting aspect of the present disclosure may have a columnar shape extended from a first end to a second end. The clamping member may include an upper jaw, a lower jaw and a pocket. The upper jaw and the lower jaw may be located away from each other. The pocket may be located between the upper jaw and the lower jaw. The upper jaw may include a first member and a second member. The second member may be located closer to the first end than the first member. Hardness of the first member may be first hardness, and hardness of the second member may be second hardness. The first hardness may be different from the second hardness.

EMBODIMENTS

<Clamping Members>

A clamping member 1 in a non-limiting embodiment of the present disclosure may be described in detail below with reference to the drawings. For the sake of description, the drawings referred to in the following may illustrate, in simplified form, only main members necessary for describing the embodiments. Hence, the clamping member 1 may include any arbitrary structural member not illustrated in the drawings referred to. Dimensions of the members in each of the drawings faithfully may represent neither dimensions of actual structural members nor dimensional ratios of these members.

The clamping member 1 may have a columnar shape extended from a first end 1a to a second end 1b as in a non-limiting embodiment illustrated in FIGS. 1 to 4. The clamping member 1 may include an upper jaw 3, a lower jaw 5 and a pocket 7. The upper jaw 3 and the lower jaw 5 may be located away from each other. The pocket 7 may be located between the upper jaw 3 and the lower jaw 5. As used herein, "the upper jaw 3" and "the lower jaw 5" may be used for the sake of convenience, and may not indicate directions of upper and lower. For example, the upper jaw 3 may not need to be directed upward when using the clamping member 1.

Figure 1:
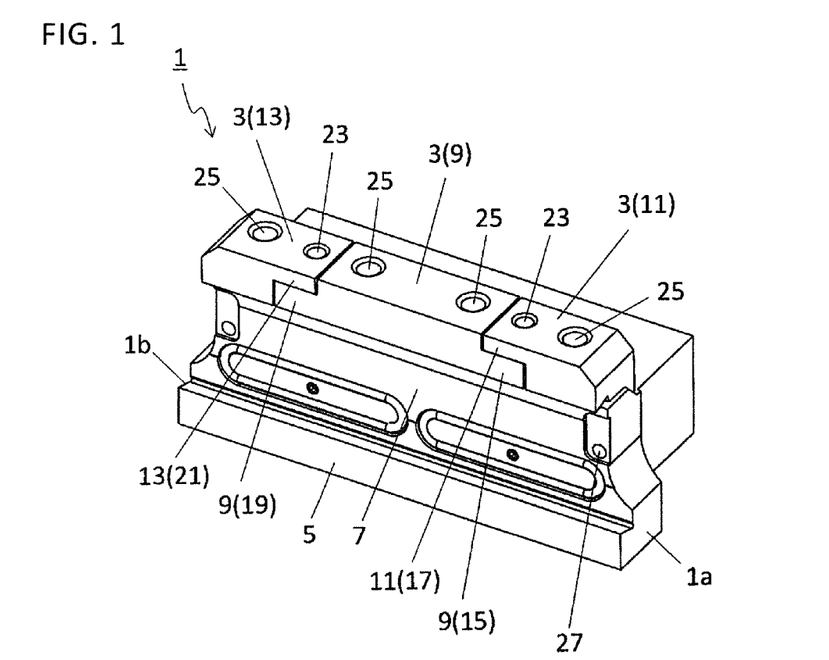
FIG. 1 is a perspective view illustrating a clamping member in a non-limiting embodiment of the present disclosure.
Figure 2:
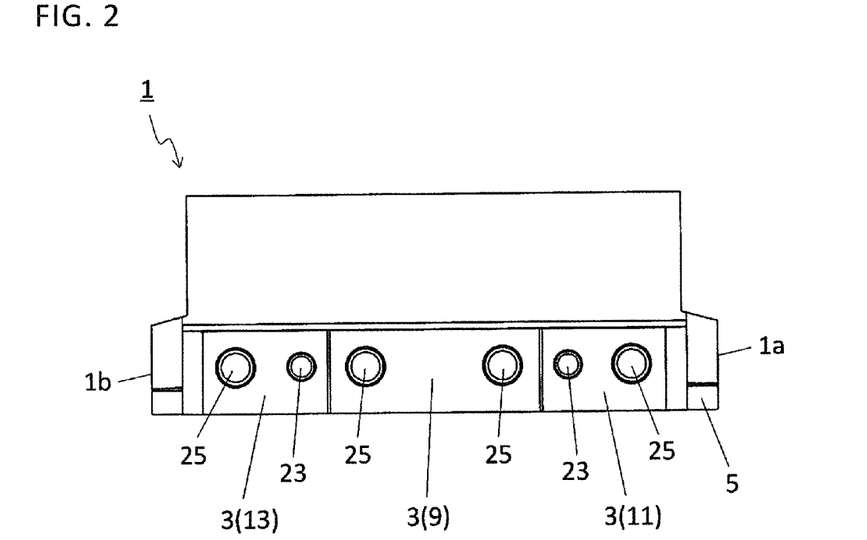
FIG. 2 is a plan view of the clamping member illustrated in FIG. 1 as viewed from a side of an upper jaw.
Figure 3:
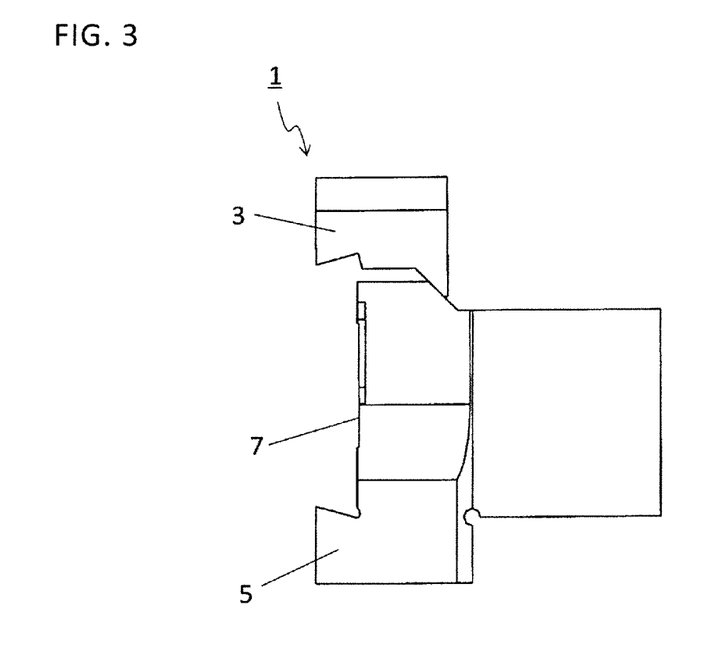
FIG. 3 is a plan view of the clamping member illustrated in FIG. 1 as viewed from a side of a first end.

A lower right end may be the first end 1a and an upper left end may be the second end 1b as in the non-limiting embodiment illustrated in FIG. 1. In general, the first end 1a may be called a front end, and the second end 1b may be called a rear end. The clamping member 1 may have a prism shape extended from the first end 1a to the second end 1b as in the non-limiting embodiment illustrated in FIG. 1. The shape of the clamping member 1 is not limited to the prism shape.

The clamping member 1 is not limited to specific dimensions. For example, in a front view of the upper jaw 3, a length of the clamping member 1 in an extending direction of the clamping member 1 may be set to approximately 40-100 mm, and a length of the clamping member 1 in a direction orthogonal to the extending direction of the clamping member 1 may be set to approximately 10-20 mm. A height of the clamping member 1 indicated by a distance between an upper end of the upper jaw 3 and a lower end of the lower jaw 5 may be set to approximately 30-60 mm.

The upper jaw 3 and the lower jaw 5 may be contactable (touchable) with a cutting tool, and may be capable of holding the cutting tool therebetween when the cutting tool is attached to the clamping member 1. The cutting tool may be positionable in the pocket 7. It may therefore be possible to hold the cutting tool with the clamping member 1 by positioning the cutting tool in the pocket 7, and by bringing the upper jaw 3 and the lower jaw 5 into contact with the cutting tool.

Examples of material of the upper jaw 3 may include elastic member, such as rubber, resins, steel and cast iron. Examples of material of the lower jaw 5 may include steel and cast iron. The materials of the upper jaw 3 and the lower jaw 5 are not limited to these illustrated materials.

The upper jaw 3 may include a first member 9 and a second member 11 as in the non-limiting embodiment illustrated in FIGS. 1 to 4. The second member 11 may be located closer to the first end 1*a* than the first member 9. At least a part of the second member 11 may be located closer to the first end 1*a* than the first member 9. The second member may be located closer to the first end 1*a* than the first member 9 in a front view of the clamping member 1 as viewed from a side of the upper jaw 3 as in the non-limiting embodiment illustrated in FIG. 2.

Hardness of the first member 9 may be first hardness, and hardness of the second member 11 may be second hardness. The first hardness may be different from the second hardness. In this case, the hardness of the upper jaw may be controllable. That is, the hardness of the upper jaw 3 in the extending direction of the clamping member 1 may be controllable by the first member 9 and the second member 11 that are different in hardness. For example, the hardness of the upper jaw 3 may be controllable according to the shape of the cutting tool and machining conditions. This may make it possible to stably hold the cutting tool with the clamping member 1.

The first hardness may be higher or lower than the second hardness. For example, if the material of the first member 9 is rubber and the material of the second member 11 is steel, the first hardness may be lower than the second hardness. If the first hardness is lower than the second hardness, it may be easy to more stably hold the cutting tool with the clamping member 1.

In cases where a part of the cutting tool which is used as a cutting edge is located in a state of being protruded more outward than the first end 1*a*, if the second hardness is relatively high, the cutting tool can be stably held with the second member 11 located closer to the cutting edge than the first member 9 in the clamping member 1. If the first hardness is relatively low, vibration caused by the cutting process may tend to be absorbed by the first member 9. This may facilitate to improve surface quality of a machined surface of a workpiece.

The clamping member 1 may further include a third member 13. The third member 13 may be located closer to the second end 1*b* than the first member 9. At least a part of the third member 13 may be located closer to the second end 1*b* than the first member 9. The third member 13 may be located closer to the second end 1*b* than the first member 9 in a front view of the clamping member 1 as viewed from a side of the upper jaw 3 as in the non-limiting embodiment illustrated in FIG. 2.

Hardness of the third member 13 may be third hardness. The first hardness may be different from the third hardness. This may lead to a high degree of freedom in hardness control of the upper jaw 3.

The first hardness may be higher or lower than the third hardness. For example, if the material of the first member 9 is rubber and the material of the third member 13 is steel, the first hardness may be lower than the third hardness. If the first hardness is lower than the third hardness, it may be easy to more stably hold the cutting tool with the clamping member 1. The second hardness and the third hardness may be identical with or different from each other.

For example, in cases where a part of the cutting tool which is used as a cutting edge is located in a state of being protruded more outward than the second end 1*b*, if the third hardness is relatively high, the cutting tool can be stably held with the third member 13 located closer to the cutting edge than the first member 9 in the clamping member 1. If the first hardness is relatively low, vibration caused by the cutting process may tend to be absorbed by the first member 9. This may facilitate to improve the surface quality of the machined surface of the workpiece.

In cases where the cutting tool is brought into contact with the first member 9, the second member 11 and the third member 13, if the second hardness and the third hardness are relatively high, the cutting tool can stably be held with the clamping member 1 on both of the first end 1*a* and the second end 1*b* in the clamping member 1. This may facilitate to stabilize a position of the cutting tool.

Hardness of the lower jaw 5 may be fourth hardness. The first hardness may be lower than the fourth hardness. For example, if the material of the first member 9 is rubber and the material of the lower jaw 5 is steel, the first hardness may be lower than the fourth hardness. If the first hardness is lower than the fourth hardness, main cutting force exerted on the cutting tool during a cutting process may tend to be easily received by the lower jaw 5 having relatively high hardness. The second hardness and the fourth hardness may be identical with or different from each other. Similarly, the third hardness and the fourth hardness may be identical with or different from each other.

The first hardness, the second hardness, the third hardness and the fourth hardness may be evaluated by Young's modulus. The Young's modulus may be measured with nano-indentation method.

The first hardness, the second hardness, the third hardness and the fourth hardness are individually not limited to a specific value. If the first hardness, the second hardness, the third hardness and the fourth hardness are evaluated by the Young's modulus, each hardness may be set as follows. The first hardness may be set to, for example, 20 MPa to 240 GPa. The second hardness may be set to, for example, 30 MPa to 250 GPa. The third hardness may be set to, for example, 30 MPa to 250 GPa. The fourth hardness may be set to, for example, 30 MPa to 250 GPa.

The first hardness, the second hardness, the third hardness and the fourth hardness may be evaluated by attenuation rate. The attenuation rate may tend to be low if the hardness is high. In contrast, the attenuation rate may tend to be high if the hardness is low. The attenuation rate may be measured according to JIS Z 2354(1992).

Figure 4:
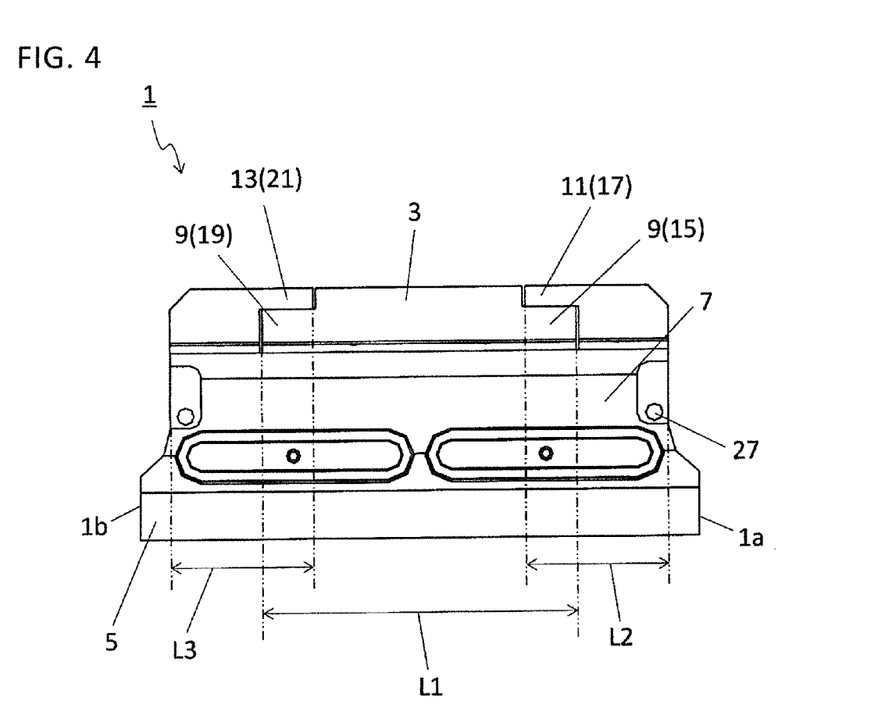
FIG. 4 is a plan view of the clamping member illustrated in FIG. 1 as viewed from a side of a pocket.
Figure 5:
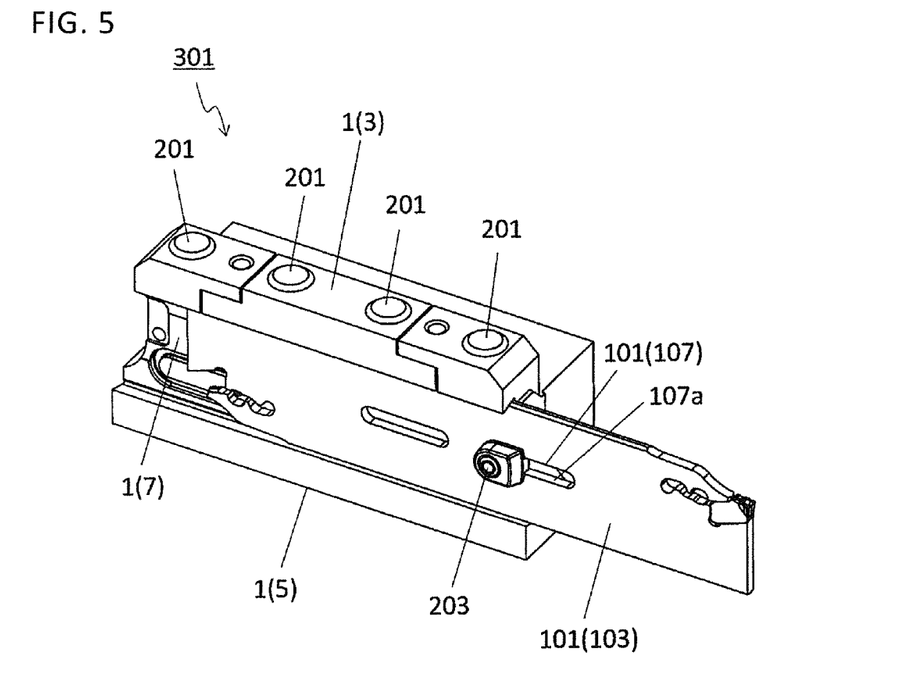
FIG. 5 is a perspective view illustrating a machine tool in a non-limiting embodiment of the present disclosure.
Figure 6:
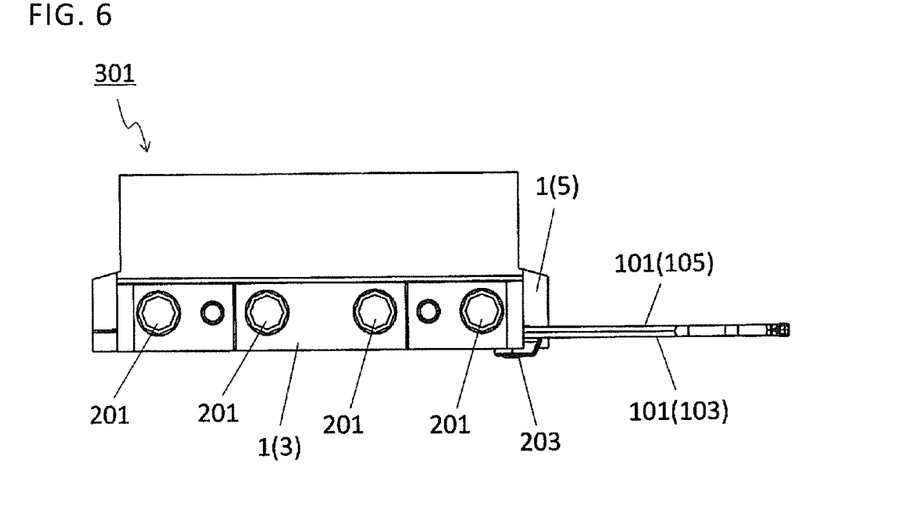
FIG. 6 is a plan view of the machine tool illustrated in FIG. 5 as viewed from a side of the upper jaw.

As in the non-limiting embodiment illustrated in FIG. 4, a length of the first member 9 in the extending direction of the clamping member 1 may be a first length L1, and a length of the second member 11 in the extending direction of the clamping member 1 may be a second length L2. A maximum value of the first length L1 may be larger than a maximum value of the second length L2. In this case, the cutting tool may be less prone to positional deviation in a direction orthogonal to the extending direction of the clamping member 1 in a front view of the upper jaw 3.

A length of the third member 13 in the extending direction of the clamping member 1 may be a third length L3. A maximum value of the first length L1 may be larger than a maximum value of the third length L3. In this case, the cutting tool may be less prone to positional deviation in the direction orthogonal to the extending direction of the clamping member 1 in a front view of the upper jaw 3. The second length L2 and the third length L3 may be identical with or different from each other.

The first member 9 may include a first step 15. The first step 15 may be located on a side of the first end 1a. The second member 11 may include a second step 17. The second step 17 may be located on a side of the first member 9 and located further away from the lower jaw 5 than the first step 15. The first member 9 and the second member 11 may be fixed in a state where the first step 15 and the second step 17 are opposed to each other. In this case, the cutting tool may be less prone to positional deviation in the direction orthogonal to the extending direction of the clamping member 1 in a front view of the upper jaw 3.

The first member 9 may include a third step 19. The third step 19 may be located on a side of the second end 1b. The third member 13 may include a fourth step 21. The fourth step 21 may be located on a side of the first member 9 and located further away from the lower jaw 5 than the third step 19. The first member 9 and the third member 13 may be fixed in a state where the third step 19 and the fourth step 21 are opposed to each other. In this case, the cutting tool may be less prone to positional deviation in the direction orthogonal to the extending direction of the clamping member 1 in a front view of the upper jaw 3.

The clamping member 1 may include a screw 23. The first member 9 and the second member 11 may be fixed with the screw 23. Similarly, the first member 9 and the third member 13 may be fixed with the screw 23.

The clamping member 1 may include a first screw hole 25. The first screw hole 25 may pass through the upper jaw 3 toward the lower jaw 5. A first screw may be insertable into the first screw hole 25. Clamping force may be controllable by fastening the first screw inserted into the first screw hole 25. The first screw hole 25 may be located from the upper jaw 3 to the lower jaw 5 as in the non-limiting embodiment illustrated in FIG. 1. Alternatively, the clamping member 1 may include a plurality of first screw holes 25.

The clamping member 1 may include a second screw hole 27. The second screw hole 27 may open into the pocket 7 so as to be exposed from through holes respectively opening into the first lateral surface and a second lateral surface located on a side opposite to the first lateral surface in the cutting tool having the plate shape. A second screw may be insertable into the second screw hole 27. The cutting tool may be fixable into the pocket 7 by fastening the second screw inserted into the through holes and the second screw hole 27.

<Machine Tools>

A machine tool 301 in a non-limiting embodiment of the present disclosure may be described below with reference to the drawings.

The machine tool 301 may include the clamping member 1 and the cutting tool 101 as in a non-limiting embodiment illustrated in FIGS. 5 to 8. If the machine tool 301 includes the clamping member 1, the hardness of the upper jaw 3 may be controllable, thereby offering excellent cutting performance.

The cutting tool 101 may be located in the pocket 7. In other words, the cutting tool 101 may be held between the upper jaw 3 and the lower jaw 5. The cutting tool 101 may be attached in a state where at least a part of a region used as a cutting edge is protruded outward from the clamping member 1. Specifically, the cutting edge 119 of the cutting tool 101 may be located further away from the second end 1b than the first end 1a as in the non-limiting embodiment illustrated in FIG. 5.

Figure 9:
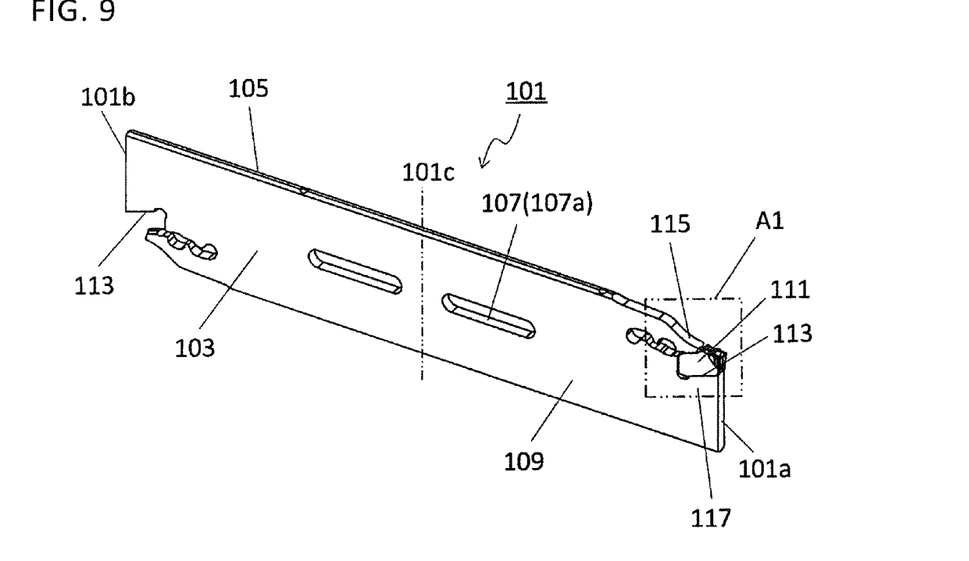
FIG. 9 is a perspective view of a cutting tool in the machine tool illustrated in FIG. 5.
Figure 10:
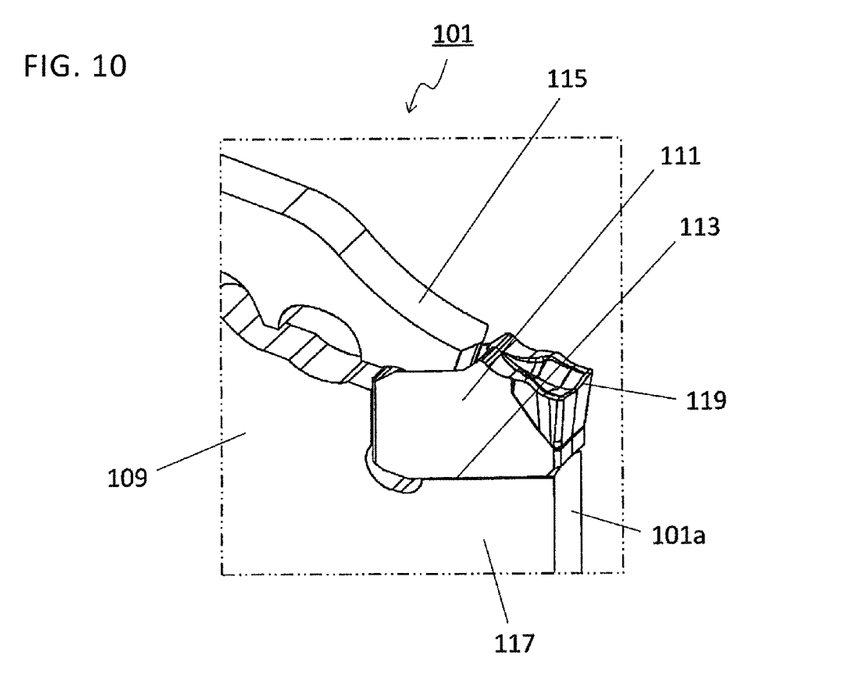
FIG. 10 is an enlarged view of a region A1 illustrated in FIG. 9.

The cutting tool 101 may have a plate shape extended from a third end 101a to a fourth end 101b as in a non-limiting embodiment illustrated in FIGS. 9 and 10. The cutting tool 101 may include a first lateral surface 103, a second lateral surface 105 and a through hole 107. The second lateral surface 105 may be located on a side opposite to the first lateral surface 103. The through hole 107 may open into the first lateral surface 103 and the second lateral surface 105. The second screw may be insertable into the through hole 107.

A lower right end may be the third end 101a and an upper left end may be the fourth end 101b as in the non-limiting embodiment illustrated in FIG. 9. In general, the third end 101a may be called a front end, and the fourth end 101b may be called a rear end. The first lateral surface 103 and the second lateral surface 105 may have a quadrangular (rectangular) shape, and may be respectively extended from a side of the third end 101a and a side of the fourth end 101b as in the non-limiting embodiment illustrated in FIG. 9.

The cutting tool 101 is not limited to specific dimensions. For example, in a front view of the cutting tool 101 located in the pocket 7 as viewed from a side of the upper jaw 3, a length of the cutting tool 101 in the extending direction of the cutting tool 101 may be set to approximately 80-160 mm, and a length of the cutting tool 101 in a direction orthogonal to the extending direction of the cutting tool 101 may be set to approximately 1-10 mm. A height of the cutting tool 101 in a direction from the upper jaw 3 toward the lower jaw 5 may be set to approximately 15-35 mm.

The machine tool 301 may include a first screw 201 and a second screw 203. The first screw 201 may be inserted into the first screw hole 25 of the clamping member 1. The second screw 203 may be inserted into the through hole 107 and the second screw hole 27 of the clamping member 1. In these cases, it may be possible to stably fix the cutting tool 1 into the pocket 7. That is, because of fixing with the first screw 201, it may be easy to receive the main cutting force exerted on the cutting tool 101 during the cutting process. Additionally, because of fixing with the second screw 203, the cutting tool 101 may be less likely to bend during the cutting process. This may make it possible to stably fix the cutting tool 101 into the pocket 7.

Figure 8:
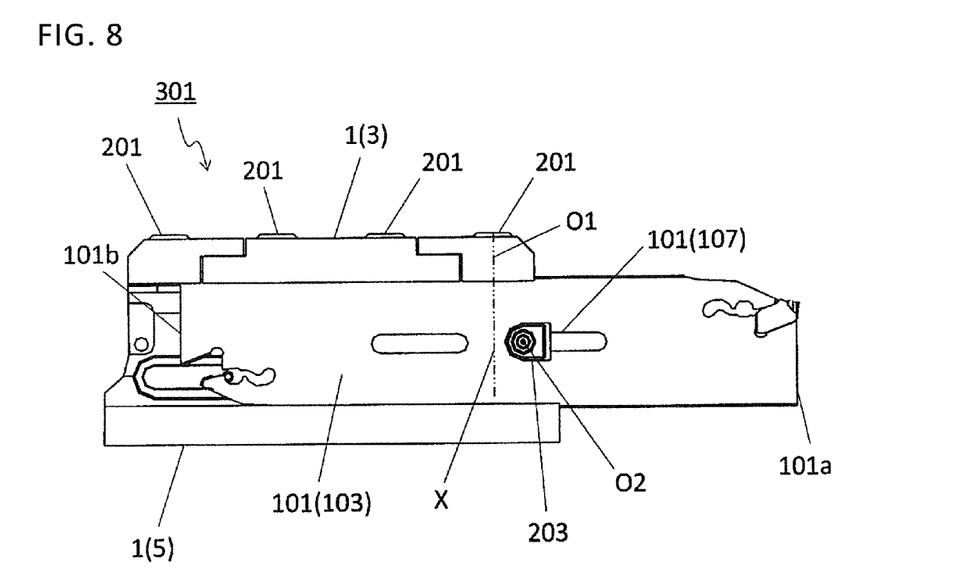
FIG. 8 is a plan view of the machine tool illustrated in FIG. 5 as viewed from a side of a first lateral surface.

As in the non-limiting embodiment illustrated in FIG. 8, an imaginary line X obtained by extending a first central axis O1 of the first screw 201 toward the lower jaw 5 may not intersect with a second central axis O2 of the second screw 203. This may make it possible to stably fix the cutting tool 101 into the pocket 7.

The second central axis O2 may be located closer to the third end 101a than the imaginary line X in a side view from a side of the first lateral surface 103. In this case, the cutting tool 101 may be less likely to bend during the cutting process.

Figure 7:
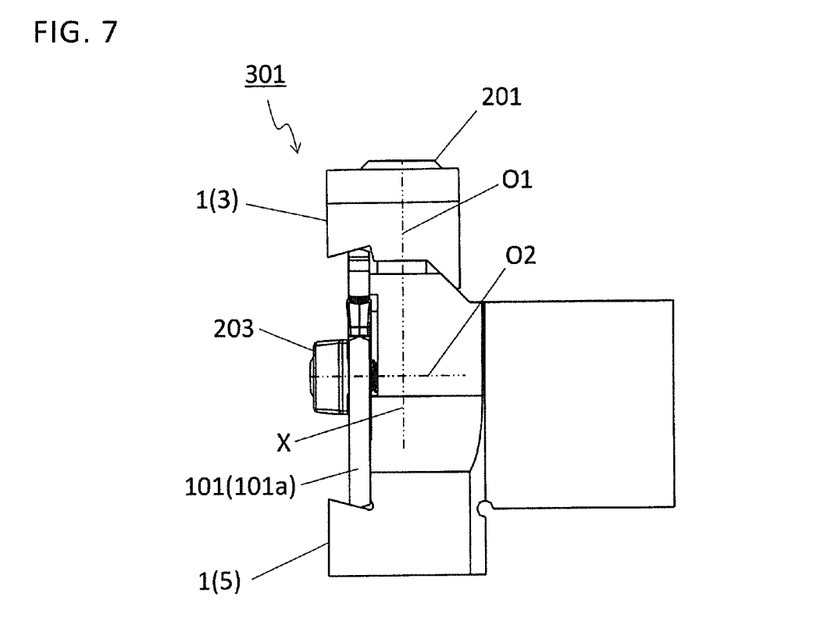
FIG. 7 is a plan view of the machine tool illustrated in FIG. 5 as viewed from a side of the first end (a third end)

In a front view from a side of the third end 101a as in the non-limiting embodiment illustrated in FIG. 7, the imaginary line X obtained by extending the first central axis O1 of the first screw 201 toward the lower jaw 5 may intersect with the second central axis O2 of the second screw 203. This may lead to uniform contact between a blade and a tool block, and this may contribute to improving pressure, thereby reducing vibration of the blade. In a front view from a side of the third end 101a, the imaginary line X may be orthogonal to the second central axis O2. As used herein, being orthogonal is not limited to being strictly orthogonal, but may mean to allow for a range of approximately 90±5°.

The machine tool 301 may include a plurality of first screws 201. The clamping member 1 may include a plurality of first screw holes 25 as described above. At least one of the first screws 25 may be located closer to the second end 1b than the second screw hole 27. At least one of the first screws 201 may be inserted into the first screw hole 25 located closer to the second end 1b than the second screw hole 27. In these cases, it may be easy to receive the main cutting force exerted on the cutting tool 101 during the cutting process.

The through hole 107 may be located closer to the third end 101a than a center 101c of the cutting tool 101 in the extending direction of the cutting tool 101 as in the non-limiting embodiment illustrated in FIG. 9. In this case, the through hole 107 may be located near the cutting edge subjected to a cutting load during the cutting process. Accordingly, the fixing with the second screw 203 may be located near the cutting edge, and the cutting tool 101 may therefore be less likely to bend during the cutting process.

The second screw 203 may be located away from an inner wall surface 107a of the through hole 107. This may make it possible to control an amount of protrusion of the blade.

The through hole 107 may be extended along the extending direction of the cutting tool 101. In other words, the through hole 107 may have a slit shape. This may make it possible to control an amount of protrusion of the cutting tool 101.

The cutting tool 101 may include a holder 109 and a cutting insert 111 (hereinafter also referred to simply as an insert 111).

The holder 109 may have a plate shape extended from a side of the third end 101a to a side of the fourth end 101b. The holder 109 may include an insert pocket 113 located on a side of the third end 101a. As in a non-limiting embodiment illustrated in FIG. 10, the holder 109 may include an upper jaw part 115 and a lower jaw part 117 which are located on a side of the third end 101a and are located away from each other, and the insert pocket 113 may be formed by the upper jaw part 115 and the lower jaw part 117.

The insert 111 may be located in the insert pocket 113. In other words, the insert 111 may be held between the upper jaw part 115 and the lower jaw part 117.

The insert 111 may have a columnar shape extended from a side of the third end 101a toward a side of the fourth end 101b. The insert 111 may have a prism shape as in the non-limiting embodiment illustrated in FIG. 10. The shape of the insert 111 is not limited to the prism shape.

The insert 111 may include a cutting edge 119. The insert 111 may be located in the insert pocket 113 so that the cutting edge 119 is protruded outward on a side of the third end 101a of the holder 109. The cutting tool 101 may be capable of carrying out a cutting process by bringing the cutting edge 119 into contact with a workpiece.

Steel and cast iron may be used as a material of the holder 109. Of these materials, the use of steel may particularly contribute to enhancing toughness of the holder 109.

For example, inorganic materials, such as cemented carbide, cermet and ceramics, may be usable as a material of the insert 111. Examples of composition of the cemented carbide may include WC (tungsten carbide)-Co, WC—TiC (titanium carbide)-Co and WC—TiC—TaC (tantalum carbide)-Co. As used herein, WC, TiC and TaC may be hard particles, and Co may be a binding phase.

The cermet may be a sintered composite material obtainable by compositing metal into a ceramic component. Examples of the cermet may include compounds composed mainly of TiC or TiN (titanium nitride). Of course, it should be clear that the material of the insert 111 is not limited to these materials.

The cutting tool 101 for use in a so-called turning process may be illustrated in the non-limiting embodiment illustrated in FIG. 9. The cutting tools 101 in the non-limiting embodiments of the present disclosure may be usable for a grooving process, but the use thereof is not limited thereto. There is no problem even if the cutting tools 101 in the non-limiting embodiments are used for an inner diameter process, an outer diameter process and a traversing process.

<Methods for Manufacturing Machined Product>

Methods for manufacturing a machined product 401 in non-limiting embodiments of the present disclosure may be described below with reference to the drawings.

The machined product 401 may be manufacturable by carrying out a cutting process of a workpiece 403. The methods for manufacturing the machined product 401 in the non-limiting embodiments may include the following steps:

(1) rotating the workpiece 403;
(2) bringing the cutting tool 101 in a machine tool 301 represented by the above non-limiting embodiments into contact with the workpiece 403 being rotated; and
(3) moving the cutting tool 101 away from the workpiece 403.

Figure 11:
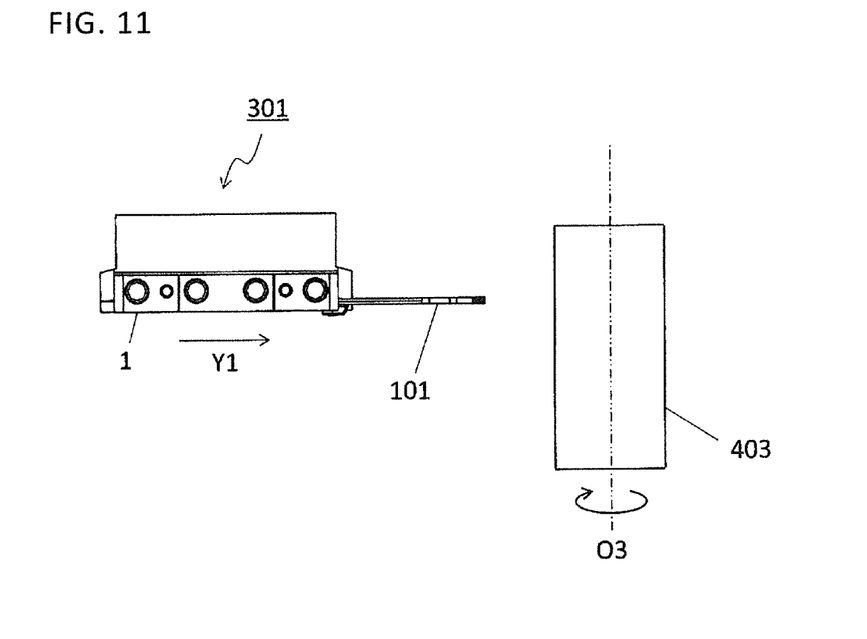
FIG. 11 is a schematic diagram illustrating one of steps in a method for manufacturing a machined product in a non-limiting embodiment of the present disclosure.
Figure 12:
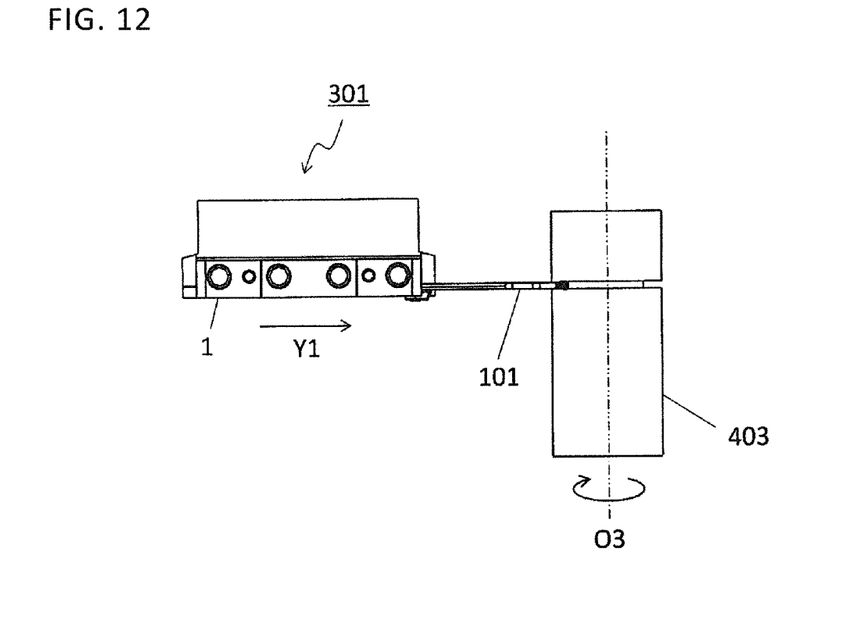
FIG. 12 is a schematic diagram illustrating one of the steps in the method for manufacturing a machined product in the non-limiting embodiment of the present disclosure.
Figure 13:
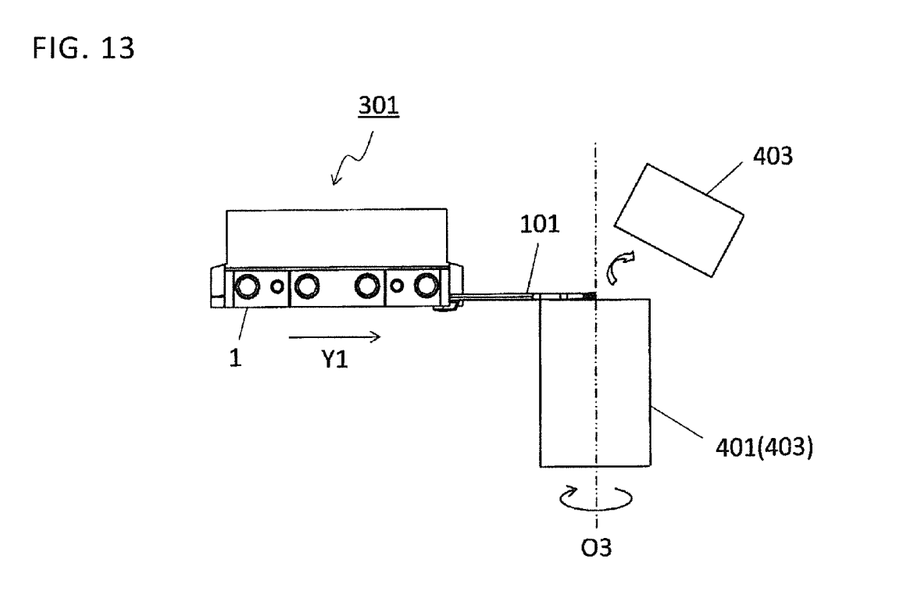
FIG. 13 is a schematic diagram illustrating one of the steps in the method for manufacturing a machined product in the non-limiting embodiment of the present disclosure.
Figure 14:
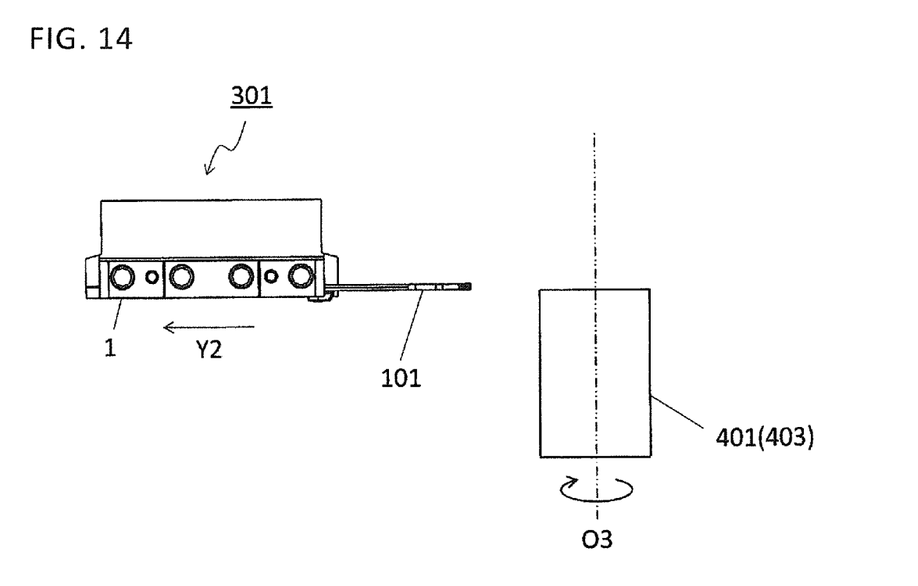
FIG. 14 is a schematic diagram illustrating one of the steps in the method for manufacturing a machined product in the non-limiting embodiment of the present disclosure.

More specifically, firstly, the workpiece 403 may be rotated around an axis O3, and the cutting tool 101 attached to the tool machine 301 may be relatively brought near the workpiece 403 as in a non-limiting embodiment illustrated in FIG. 11. Subsequently, the workpiece 403 may be cut out by bringing the ridgeline (cutting edge) of the cutting tool 101 into contact with the workpiece 403 as in a non-limiting embodiment illustrated in FIGS. 12 and 13. Thereafter, the cutting tool 101 may be relatively moved away from the workpiece 403 as in a non-limiting embodiment illustrated in FIG. 14.

In the non-limiting embodiment illustrated in FIG. 11, the cutting tool 101 may be brought near the workpiece 403 by moving the cutting tool 101 in a Y1 direction in a state where the axis O3 is fixed and the workpiece 403 is rotated around the axis O3. In the non-limiting embodiment illustrated in FIGS. 12 and 13, the workpiece 403 may be cut out by bringing the cutting edge 119 of the insert 111 into contact with the workpiece 403 being rotated. In the non-limiting embodiment illustrated in FIG. 14, the cutting tool 101 may be moved away by moving the cutting tool 101 in a Y2 direction in a state where the workpiece 403 is rotated.

In the cutting process with the manufacturing method in the non-limiting embodiments, the cutting tool 101 may be brought into contact with the workpiece 403, or the cutting tool 101 may be moved away from the workpiece 403 by moving the cutting tool 101 in the individual steps. The cutting tool 101 may be moved away from the workpiece 203 by moving the cutting tool 101. However, there is no intention to limit thereto.

For example, the workpiece 403 may be brought near the cutting tool 101 in the step (1). Similarly, the workpiece 403 may be moved away from the cutting tool 101 in the step (3). If it is desired to continue the cutting process, the step of bringing the cutting edge 119 of the insert 111 into contact with different portions of the workpiece 403 may be repeated while keeping the workpiece 403 rotated.

Representative examples of material of the workpiece 403 may include carbon steel, alloy steel, stainless steel, cast iron or nonferrous metals.

DESCRIPTION OF THE REFERENCE NUMERAL 1 clamping member
1a first end
1b second end
3 upper jaw
5 lower jaw
7 pocket
9 first member
11 second member
13 third member
15 first step
17 second step
19 third step
21 fourth step
23 screw
25 first screw hole
27 second screw hole
101 cutting tool
101a third end
101b fourth end
101c center
103 first lateral surface
105 second lateral surface
107 through hole
107a inner wall surface
109 holder
111 cutting insert (insert)
113 insert pocket
115 upper jaw part
117 lower jaw part
119 cutting edge
201 first screw
203 second screw
301 machine tool
401 machined product
403 workpiece
L1 first length
L2 second length
L3 third length
O1 first central axis
O2 second central axis
O3 axis
X imaginary line

The invention claimed is:

1. A clamping member, having a columnar shape extended in a direction from a first end to a second end, the clamping member comprising:
an upper jaw comprising:
  a first member having a first hardness,
  a second member having a second hardness different from the first hardness, being closer to the first end than the first member, and elongated in the direction,
  a third member having a third hardness different from the first hardness, being closer to the second end than the first member, and elongated in the direction;
a lower jaw located away from the upper jaw; and
a pocket:
  located between the upper jaw and the lower jaw, and configured to receive a cutting tool,
wherein the first member, the second member, and the lower jaw are configured to fix the cutting tool in response to receiving the cutting tool, and
on a condition that the cutting tool is fixed to the clamp member, the first member contacts the cutting tool in a contact area, the second member contacts the cutting tool in an area closer to the first end than the contact area, the third member contacts an upper surface in an area closer to the second end than the contact area, and the lower jaw contacts the cutting tool.

2. The clamping member according to claim 1, wherein the first hardness is lower than the second hardness.

3. The clamping member according to claim 1, wherein the first hardness is lower than the third hardness.

4. The clamping member according to claim 1, wherein
the lower jaw has a fourth hardness, and
the first hardness is lower than the fourth hardness.

5. The clamping member according to claim 1, wherein
a length of the first member in an extending direction of the clamping member is a first length,
a length of the second member in the extending direction of the clamping member is a second length, and
a maximum value of the first length is larger than a maximum value of the second length.

6. The clamping member according to claim 1, wherein
the first member comprises a first step,
the second member comprises a second step,
the first step comprises:
  a first surface facing the first end,
  a second surface facing the first end, and
  a third surface between the first surface and the second surface,
the second step comprises:
  a fourth surface facing the second end and opposed to the first surface,
  a fifth surface facing the second end and opposed to the second surface, and
  a sixth surface between the first surface and the second surface and in contact with the third surface.

7. A machine tool, comprising:
the clamping member according to claim 1; and
the cutting tool located in the pocket.

8. A method for manufacturing a machined product, comprising:
rotating a workpiece in the machine tool according to claim 7;
bringing the cutting tool in the machine tool according to claim 7 into contact with the workpiece being rotated; and
moving the cutting tool away from the workpiece.

9. A holder for clamping an object, the holder comprising:
a first clamping member elongated in a direction, and comprising:
  a first member having a first hardness, a first clamping surface, and a first step,
  a second member, the second member includes:
    a second hardness different from the first hardness,
    a second clamping surface that is on a line with the first clamping surface in the direction and a second step, and
    being in contact with the first clamping member, and
  a third member, the third member includes:
    a third hardness different from the first hardness, being closer to the second end than the first member, and elongated in the direction; and
a second clamping member comprising a third clamping surface, opposed to the first clamping surface and the second clamping surface; and
a pocket surrounded by the first clamping surface, a second clamping surface and the third clamping surface, and the pocket configured to receive a cutting tool, wherein the first step comprises:
a first surface facing the first end,
a second surface facing the first end, and
a third surface between the first surface and the second surface, wherein the second step comprises:
a fourth surface facing the second end and opposed to the first surface,
a fifth surface facing the second end and opposed to the second surface, and
a sixth surface between the first surface and the second surface, and in contact with the third surface, and on a condition that the cutting tool is fixed to the clamp member, the first member contacts the cutting tool in a contact area, the second member contacts the cutting tool in an area closer to the first end than the contact area, the third member contacts an upper surface in an area closer to the second end than the contact area.

10. The holder according to claim 9, wherein the first hardness is lower than the second hardness.

11. The holder according to claim 9, wherein the first hardness is lower than the third hardness.

12. The holder according to claim 9, wherein the second clamping member has a fourth hardness that is larger than the first hardness.

13. The holder according to claim 9, wherein
a length of the first member in an extending direction of the holder is a first length,
a length of the second member in the extending direction of the holder is a second length, and
a maximum value of the first length is larger than a maximum value of the second length.

14. The holder according to claim 9, wherein
the first member comprises a first step, and
the second member comprises a second step, and the second step is in contact with the first step.

15. The holder according to claim 9, wherein
the first member comprises a third step, and
the third member comprises a fourth step, and the fourth step is in contact with the third step.

16. A machining apparatus, comprising:
the holder according to claim 9; and
the cutting tool in the pocket.

17. A method for manufacturing a machined product, the method comprising:
setting the holder to the machining apparatus according to claim 16;
setting the cutting tool to the pocket of the holder according to claim 16;
set a workpiece to the machining apparatus;
rotating the workpiece;
contact the cutting tool to the workpiece such that the cutting tool removes a piece of the workpiece.

* * * * *